Sept. 23, 1952     W. H. HARSTICK ET AL     2,611,269
MAGNETICALLY ACTUATED MILK METERING DEVICE
Filed Dec. 22, 1949
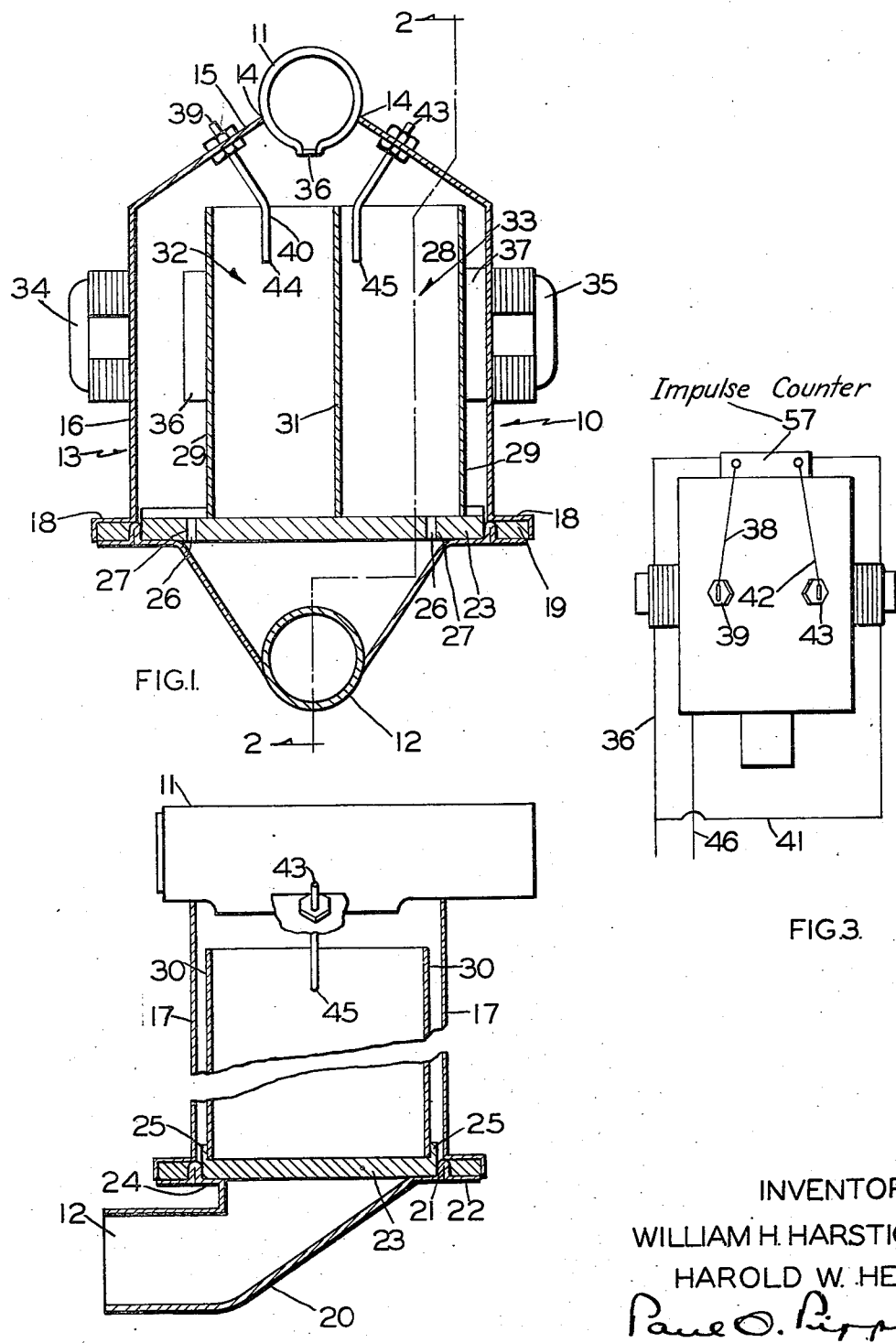
INVENTORS
WILLIAM H. HARSTICK
HAROLD W. HEIN
Paul O. Pippel
ATT'Y Patented Sept. 23, 1952

2,611,269

UNITED STATES PATENT OFFICE 2,611,269

MAGNETICALLY ACTUATED MILK METERING DEVICE

William H. Harstick, Oak Park, and Harold W. Hein, Chicago, Ill., assignors to International Harvester Company, a corporation of New Jersey Application December 22, 1949, Serial No. 134,494

8 Claims. (Cl. 73—219)

This invention relates to a liquid metering device and more particularly to an electromagnetically operated metering device for automatically measuring milk flow in a pipe line milker system.

The primary objective of the present invention is to provide a device which is placed in a piping system such as a pipe line milker system to automatically measure with accuracy the volume of liquid flowing through the system.

A further object of the invention is to provide an automatic metering device for liquids which requires no supervision and in which the measuring steps take place between an inlet pipe and an outlet pipe.

A still further object is the provision of an automatic liquid metering device wherein a plurality of slidable measuring chambers are alternatively filled with a predetermined volume of liquid and drained.

Another object is the provision of electromagnetic means for effecting communication of each measuring chamber with the outlet pipe when a predetermined volume of liquid is received in the measuring chamber.

Still another object of the invention is to provide an automatic measuring device of simple construction, reliable operation and rugged structure.

The foregoing and other important objects and desirable features inherent in and encompassed by the invention together with many of the purposes and uses thereof will become readily apparent from a reading of the ensuing description in conjunction with the annexed drawings in which:

Fig. 1 is a cross sectional view of the preferred form of the invention.

Fig. 2 is a partially sectional view of the invention taken substantially along line 2—2 of Fig. 1.

Fig. 3 is a schematic electrical wiring diagram of the electric circuit means for energizing the electromagnets.

Referring to the drawings in which like reference characters designate like elements throughout the various views, there is shown a liquid metering device 10. The liquid metering device is interposed between an inlet pipe 11, which may be a portion of the pipe line leading from the cows or other domestic animals in a pipe line milker system, and an outlet pipe 12. The inlet pipe 11 is suitably attached to the casing 13 of the liquid metering device 10 along the inner marginal edges 14 of a pair of upwardly inclined converging top walls 15. Rigidly secured to or formed integrally with the top walls 15 are a pair of vertically extending transversely spaced side walls 16 and a pair of longitudinally spaced end walls 17. The lower portion 18 of each side wall 16 and end wall 17 has an L-shaped cross section adapted to partially embrace a rectangular gasket member 19.

Positioned beneath the casing 13 approximately midway between the side walls 16 is a longitudinally extending outlet pipe 12. Secured to or formed integrally with outlet pipe 12 is a throat section 20 for directing liquid from the casing to the outlet pipe 12. The throat section 20 is attached to the gasket member 19 by means of a vertically extending flange 21 and a horizontally extending flange 22 which partially encompass the gasket member. It is to be understood that the flanges 18 and 22 are clamped together compressing the gasket member 19 therebetween and securing the throat section 20 to the casing 13 by means of bolts (not shown) or other suitable fastening means.

The casing 13 is provided with a flat bottom wall 23 rigidly held in place by the vertically extending flange 21 encircling its periphery and is supported by a horizontally extending portion 24 of the throat section 20. It will be noted that the bottom wall 23 is provided with longitudinally spaced, vertically extending flanges 25, the purpose of which will be explained hereinafter. Extending vertically through bottom wall 23 are a pair of transversely spaced apertures 26 to form outlet ports or passageways 27 whereby communication between the interior of the casing 13 and the outlet pipe 12 may be established.

Supported on the bottom wall 23 for transverse horizontal sliding movement is a hollow measuring member 28. The hollow measuring member 28 comprises a pair of spaced side walls 29 and a pair of spaced end walls 30 joined together to form a substantially rectangularly shaped member open at opposite ends. The measuring member 28 is guided in its transverse sliding movement by the above mentioned flanges 25. Secured between the end walls 30 is a vertically disposed portion 31 which divides the measuring member 28 into a pair of adjacent measuring chambers 32 and 33 which have substantially the same volumetric capacity.

Supported on each side wall 16 is an electromagnet 34, 35. Each electro-magnet when energized is adapted to magnetically attract a soft-iron core element 36, 37, one of which is fastened to each side wall 29. It will be appreciated that when electro-magnet 34 is energized core element 36 together with the measuring member 28 to which it is attached will move to the left as viewed in Fig. 1. If the converse is true, that is, if electro-magnet 35 is energized the measuring member 28 will move to the right as shown in Fig. 1. It will be noted that when the measuring member 28 assumes the left position, as viewed in Fig. 1, caused by the energization of electro-magnet 34, communication is established between the interior of measuring chamber 32 and the outlet pipe 12 through one of the outlet ports 27. Conversely, chamber 33 is placed in communication with the outlet pipe 12 through the other outlet port 27 when electro-magnet 35 is energized. Hence, it will be seen that movement of the measuring member 28 transversely to the right or left by energizing either electro-magnet 34 or 35 will cause one of the measuring chambers but not both at the same time to communicate with one of the outlet ports 27.

Inasmuch as the inlet pipe 11, which has an inlet port 36 formed therein for directing liquid vertically downwardly to the bottom wall 23, lies in a vertical plane spaced substantially midway between the side walls 16 of the casing 13 and the vertically disposed partition 31 moves transversely from one side to the other of the vertical plane when the measuring member 28 is actuated by the electro-magnets as described above, the measuring chambers will be alternatively capable of receiving liquid from the inlet pipe. When one of the measuring chambers is in the liquid receiving position, it is not in communication with an outlet port and conversely when a measuring chamber is in communication with an outlet port, it is no longer capable of receiving liquid from the inlet port.

In order to energize the electro-magnets 34 and 35 electric circuit means are provided which includes an electrical conductor 36 leading from one side of a source of electrical energy to electro-magnet 34 and then to an impulse counter 57. The impulse counter 57 is shown diagrammatically since it may be of conventional design known to those familiar with the art. The impulse counter 57 records the number of times the electrical circuit in which it is placed is energized. Leading from the impulse counter 57 is a conductor 38 which has one end attached to a contact post 39. The contact post 39 is suitably supported in one of the top walls 15 and has a portion 40 adapted to extend vertically within the interior of the measuring chamber 32. Electro-magnet 35 is connected to the source of electrical energy by way of conductor 41 which has one end connected to the impulse counter 57. A conductor 42 leads from the impulse counter 57 to a second contact post 43 similar in construction to contact post 39. It will be noted that the vertical distance from the lowermost tip 44, 45 of each contact post to the bottom wall 23 is the same and is maintained constant throughout the operation of the device. The other side 46 of the source of electrical energy is attached to the measuring member 28 by any suitable means. Hence it is necessary to conduct electrical energy from the tips 44 and 45 to the measuring member 28 in order to complete the electric circuit means and energize the electro-magnets. The electric contact means is completed for electro-magnet 34 by filling measuring chamber 32 with liquid until the surface of the liquid makes physical contact with the tip 44 whereupon electrical energy is conducted from the tip to the measuring member 28 through the liquid. Electro-magnet 35 is energized in exactly the same manner except that measuring chamber 33 must be filled with a sufficient volume of liquid to make contact with the tip 45. Inasmuch as the tips 44 and 45 are positioned a predetermined vertical distance from the bottom wall 23 and the measuring chambers 32 and 33 have substantially the same dimensions it will be appreciated that both measuring chambers must receive the same predetermined volume of liquid before the electro-magnets associated with the measuring chambers will be energized.

Assuming the measuring member 28 to be in the position shown in Fig. 1, the operation of the liquid meter is as follows. Measuring chamber 32 will receive the initial flow of liquid from the inlet pipe 11. Both electro-magnets 34 and 35 are deenergized at the start of the operation since the liquid level in either chamber has not attained the height necessary to complete the electric circuit means associated with the electro-magnets for energizing one of the electro-magnets. The measuring chamber 32 will continue to receive liquid until the liquid level reaches the tip 44, whereupon the electric circuit means is completed and electro-magnet 34 is energized. The measuring member 28 is then magnetically actuated to the left as viewed in Fig. 1 and communciation is established between the measuring chamber 32 and the outlet port 27. The impulse counter 57 records the fact that the electrical circuit in which it lies has been energized. Measuring chamber 33 then receives liquid from the inlet pipe 11 while measuring chamber 32 is drained of the liquid contained therein. It will be appreciated that the outlet ports 27 are large enough to allow complete draining of a measuring chamber before the adjacent measuring chamber is filled with the predetermined volume of liquid regardless of the rate of flow from the inlet port. When measuring chamber 33 receives the predetermined volume of liquid, that is, when the level of the liquid reaches the tip 45, electro-magnet 35 will be energized causing the measuring member 28 to move to its initial position. The cyclic operation continues as long as liquid flows from the inlet pipe 11. The number of times the electrical circuits for the electro-magnets are in condition for conducting electrical energy is tabulated by the impulse counter 57 and since the circuits are not complete until a predetermined volume of liquid has entered one of the measuring chambers, it will be apparent that the impulses recorded by the impulse counter 57 accurately represents the volume of flow of liquid from the inlet pipe 11 to the outlet pipe 12.

The embodiment of the invention chosen for the purpose of illustration and description herein is that preferred for achieving the objects of the invention and developing the utility thereof in the most desirable manner. It will be appreciated, therefore, that the particular structural and functional aspects emphasized herein are not intended to exclude but rather to suggest such other adaptations and modifications of the invention as fall within the spirit and scope of the invention as defined in the appended claims.

What is claimed is:

1. A liquid metering device comprising a casing having a liquid inlet port adjacent the top of said casing and a flat bottom wall provided with a pair of transversely spaced outlet ports; a hollow measuring member open at opposite ends supported for transverse horizontal sliding movement on said bottom wall, said member having a vertically disposed partition therein to form a pair of measuring chambers, said measuring chambers each being adapted to alternatively communicate with said inlet port and be filled with a predetermined volume of liquid in one position and to slide to a second position wherein communication with said inlet port ceases and communication with one of said outlet ports is established to drain said measuring chamber; a pair of core elements attached to opposite sides of said measuring member; electrically energizable means for moving said measuring member from one position of said measuring chambers to the other position thereof, said means including a pair of oppositely disposed electromagnets supported on said casing adapted to magnetically attract said core elements attached to said measuring member; electric circuit means for each of said electromagnets, each of said electric circuit means being conditionable incident to a predetermined volume of liquid in one of said measuring chambers for conducting electrical energy to one of said electromagnets, each of said electric circuit means including a contact post supported by said casing adapted to project into one of said measuring chambers; and indicating means for tabulating the number of times said electric circuit means are conditioned for conducting electrical energy, said indicating means being electrically connected to said electric circuit means.

2. A liquid metering device comprising a casing having a liquid inlet port and a flat bottom wall provided with a pair of spaced outlet ports; a hollow measuring member open at opposite ends supported for horizontal sliding movement on said bottom wall, said measuring member having a pair of adjacent measuring chambers formed therein, said measuring chambers each being adapted to alternatively communicate with said inlet port and be filled with a predetermined volume of liquid in one position and to slide to a second position wherein communication with said inlet port ceases and communication with one of said outlet ports is established to drain said measuring chamber; a pair of core elements attached to opposite sides of said measuring member; electrically energizable means for moving said measuring member from one position of said measuring chambers to the other position thereof, said means including a pair of electromagnets supported on said casing adapted to magnetically attract said core elements attached to said measuring member when energized; electric circuit means for each of said electromagnets, each of said electric circuit means being conditionable incident to a predetermined volume of liquid in one of said measuring chambers for conducting electrical energy to one of said electromagnets, each of said electric circuit means including a contact post supported by said casing adapted to project into one of said measuring chambers and make physical contact with the liquid within the measuring chamber when the measuring chamber has been filled with a predetermined volume of liquid; and indicating means for tabulating the number of times said electric circuit means are conditioned for conducting electrical energy, said indicating means being electrically connected to said electric circuit means.

3. A liquid metering device comprising a casing having a liquid inlet port and a flat bottom wall provided with a pair of spaced outlet ports; a hollow measuring member open at opposite ends supported for horizontal sliding movement on said bottom wall, said measuring member having a pair of adjacent measuring chambers formed therein, said measuring chambers each being adapted to alternatively communicate with said inlet port and be filled with a predetermined volume of liquid in one position and to slide to a second position wherein communication with said inlet port ceases and communication with one of said outlet ports is established to drain said measuring chamber; a pair of electrically energizable means for moving said measuring member from one position of said measuring chambers to the other position thereof; electric circuit means for each electrically energizable means conditionable incident to a predetermined volume of liquid in one of said measuring chambers for conducting electrical energy to one of said electrically energizable means; and indicating means for tabulating the number of times said electric circuit means are conditioned for conducting electrical energy, said indicating means being electrically connected to said electric circuit means.

4. A liquid metering device comprising a casing having a liquid inlet port and a flat bottom wall provided with a pair of spaced outlet ports; a hollow measuring member open at opposite ends supported for horizontal sliding movement on said bottom wall, said measuring member having a pair of adjacent measuring chambers formed therein, said measuring chambers each being adapted to alternatively communicate with said inlet port and be filled with a predetermined volume of liquid in one position and to slide to a second position wherein communication with said inlet port ceases and communication with one of said outlet ports is established to drain said measuring chamber; a pair of electromagnets for moving said measuring member from one position of said measuring chambers to the other position thereof; electric circuit means for each electromagnet, each electric circuit means being conditionable incident to a predetermined volume of liquid in one of said measuring chambers for conducting electrical energy to one of said electromagnets; and indicating means for tabulating the number of times said electric circuit means are conditioned for conducting electrical energy, said indicating means being electrically connected to said electric circuit means.

5. A liquid metering device comprising a liquid-tight casing having a liquid inlet port and a flat bottom wall provided with a pair of spaced outlet ports; a hollow measuring member enclosed within said casing open at opposite ends supported for horizontal sliding movement on said bottom wall, said measuring member having a pair of adjacent measuring chambers formed therein, said measuring chambers being adapted to alternatively communicate with said inlet port and be filled with a predetermined volume of liquid in one position and to slide to a second position wherein communication with said inlet port ceases and communication with one of said outlet ports is established to drain said measuring chamber; actuating means for moving said measuring member from one position of said measuring chambers to the other position thereof; means responsive to a predetermined volume of liquid received in said measuring chambers in said one position for controlling said actuating means; and indicating means for tabulating the number of times said actuating means effects movement of said measuring chambers, said indicating means being connected to said responsive means.

6. A liquid metering device as set forth in claim 5 in which said actuating means includes a plurality of eelctromagnets; and said means responsive to a predetermined volume of liquid received in said measuring chambers in said one position for controlling said actuating means includes electric circuit means for energizing said electromagnets, said electric circuit means comprising switch means adapted to conduct electrical energy when a predetermined volume of liquid is received in said measuring chambers.

7. A liquid metering device comprising a casing having a liquid inlet port and a flat bottom wall provided with a plurality of spaced outlet ports; a hollow measuring member open at opposite ends supported for horizontal sliding movement on said bottom wall, said measuring member having a plurality of measuring chambers formed therein, said measuring chambers each being adapted to periodically communicate with said inlet port and be filled with a predetermined volume of liquid in one position and to slide to a second position wherein communication with said inlet port ceases and communication with one of said outlet ports is established to drain said measuring chamber; electromagnets for moving said measuring member from one position of said measuring chambers to the other position thereof, electric circuit means for each electromagnet, each electric circuit means being conditionable incident to a predetermined volume of liquid in one of said measuring chambers for conducting electrical energy to one of said electromagnets; and indicating means for tabulating the number of times said electric circuit means are conditioned for conducting electrical energy, said indicating means being electrically connected to said electric circuit means.

8. A liquid metering device comprising a casing having a liquid inlet port and a bottom wall provided with an outlet port; a hollow measuring chamber open at opposite ends supported for horizontal sliding movement on said bottom wall, said measuring chamber adapted to alternatively communicate with said inlet port and be filled with a predetermined volume of liquid in one position and to slide to a second position wherein communication with said inlet port ceases and communication with said outlet port is established to drain said measuring chamber; and an electromagnet for moving said measuring chamber from said one position to said second position; electric circuit means for said electromagnet, said electric circuit means being conditionable incident to a predetermined volume of liquid in said measuring chamber for conducting electrical energy to said electromagnet; and indicating means for tabulating the number of times said electric circuit means are conditioned for conducting electrical energy, said indicating means being electrically connected to said electric circuit means.

WILLIAM H. HARSTICK.
HAROLD W. HEIN.

REFERENCES CITED

The following references are of record in the file of this patent:

UNITED STATES PATENTS

| Number | Name | Date |
|---|---|---|
| 391,072 | Peasley | Oct. 16, 1888 |
| 2,104,373 | McNeil et al. | Jan. 4, 1938 |
| 2,369,251 | Reynolds | Feb. 13, 1945 |
| 2,457,710 | Norbom | Dec. 28, 1948 |
| 2,595,905 | McAfee | May 2, 1950 |